UNITED STATES PATENT OFFICE.

ALEXANDER FELDMANN, OF LINDEN, NEAR HANOVER, PRUSSIA, GERMANY.

PROCESS OF MAKING FIRE-PROOF MATERIALS.

SPECIFICATION forming part of Letters Patent No. 406,714, dated July 9, 1889.

Application filed July 7, 1886. Serial No. 207,367. (No specimens.)

*To all whom it may concern:*

Be it known that I, ALEXANDER FELDMANN, a subject of the King of Prussia, and residing at Linden, near Hanover, in the Kingdom of Prussia, have invented new and useful Improvements in the Process of Making Fire-Proof Materials, of which the following is a specification.

My invention consists in the production of fire-proof materials and of articles such as bricks and vessels, and also of enamel, which are entirely or nearly free from silicic acid, out of a composition of fluoride of magnesium and magnesia, to which, however, alumina or alumina and lime may be added without materially altering the composition, whose essential ingredients are the aforesaid fluoride of magnesium and magnesia, and without therefore departing from the spirit of my invention.

For carrying out the invention the fluoride and the oxide or oxides to be employed are first reduced to a fine powder, which may be washed, if considered necessary. Alumina may also be used in the gelatinous state in which it is obtained by precipitation from solutions of the same. The substances are then mixed, and so much water is added thereto that by kneading a dough will be produced. This dough, being dried and burned at such a temperature that its constituents sinter together, forms the fire-proof material.

If articles of definite shape are required, they are formed in any suitable manner, preferably by pressing the dough into molds, to which it does not adhere—for instance, into oiled molds of wood or metal. The drying and burning of the molded articles is the same as that of the crude dough. In case the mass is to serve as enamel it is laid on the metallic surfaces to be coated and heated together with these. It then adheres firmly to them.

The substances may with advantage be mixed in such proportion that their quantities by weight correspond to the chemical-combining weights. According to this, for instance, forty parts, by weight, of magnesia (computed in anhydrous state) would have to be mixed with sixty-two parts, by weight, of fluoride of magnesium. Under these conditions the ingredients combine in the heat to form oxyfluoride. The quantity of the oxide may, however, be considerably increased, so as to amount, in the proportion of the combining-weights, to twice or several times the quantity of the fluoric compound. With such increase the property of the articles produced from the mixture to resist heat becomes still greater.

The dough obtained as described, and which is not very plastic, may be improved in this quality by the addition of some pipe-clay. The silica which is thereby brought into the mass, as well as any small quantity of silica that may be contained in the main ingredients employed, combines during the burning process wholly or for the greater part with a part of the fluorine to form fluoride of silicium, which is driven off.

The material and articles manufactured, as described, are far more fire-proof and durable than other compositions designed for similar purposes. The highest refractory quality is possessed by the compounds containing alumina, inasmuch as these resist temperatures up to about 4,500° centigrade, and besides the articles produced thereof may be cooled in red-hot state in water without cracking. Moreover, all the articles made according to my invention resist chemical influences much better as well in hot as in cold state than other fire-proof materials.

I am aware that fire-proof compounds which in their chemical constitution are similar to those described in the foregoing have heretofore been made of fluoride of calcium and lime or magnesia; but those obtained from the said fluoride and lime or lime and magnesia fall into powder after a short time, while the compound produced from the calcic fluoride and magnesia alone either becomes soft when heated or it cracks.

This invention is somewhat related to that described in my application for patent, Serial No. 256,139, filed November 24, 1887, for improvements in the process of producing the fluorides of magnesium, &c.

Having thus described my invention, the following is what I claim as new therein and desire to secure by Letters Patent:

The process of producing fire-proof material and articles by comminuting fluoride of magnesium and magnesia, mixing the substances together with water and making a dough thereof, imparting to the said dough the required form, and subsequently drying
5 and burning the same, substantially as described.

In testimony whereof I have hereunto set my hand in the presence of two subscribing witnesses.

ALEXANDER FELDMANN.

Witnesses:
 HENRY SPRINGMANN,
 B. ROI.